United States Patent [19]

Nakajima et al.

[11] Patent Number: 4,690,515

[45] Date of Patent: Sep. 1, 1987

[54] COMPACT PROJECTION LENS

[75] Inventors: Yasuo Nakajima, Ibaraki; Yoshiharu Yamamoto, Toyonaka; Yoshito Miyatake; Yoshitomi Nagaoka, both of Neyagawa; Shusuke Ono, Takatsuki, all of Japan

[73] Assignee: Matsushita Electric Industrial Co., Ltd., Osaka, Japan

[21] Appl. No.: 802,341

[22] Filed: Nov. 25, 1985

[30] Foreign Application Priority Data

Dec. 20, 1984 [JP] Japan .................. 59-269783
Feb. 6, 1985 [JP] Japan .................. 60-21251
Mar. 30, 1985 [JP] Japan .................. 60-65044

[51] Int. Cl.⁴ ................. G02B 9/12; G02B 9/34; G02B 13/18
[52] U.S. Cl. ................. 350/432; 350/412
[58] Field of Search ................. 350/432, 412, 474

[56] References Cited

U.S. PATENT DOCUMENTS 4,300,817 11/1981 Betensky ................. 350/432
4,348,081 9/1982 Betensky ................. 350/432
4,548,480 10/1985 Yamamoto et al. ................. 350/432
4,564,269 1/1986 Uehara ................. 350/432

FOREIGN PATENT DOCUMENTS 55-124114 9/1980 Japan .
57-34515 2/1982 Japan .
57-108818 7/1982 Japan .
58-125007 7/1983 Japan .

Primary Examiner—John K. Corbin
Assistant Examiner—Rebecca D. Gass
Attorney, Agent, or Firm—Wenderoth, Lind & Ponack

[57] ABSTRACT

A compact projection lens for projecting an enlargement of an image appearing on a cathode ray tube (CRT) onto the screen. The projection lens has a first lens having a positive optical power and at least one aspheric surface, surface of the first lens that faces the screen being convex, a second lens having bi-convex surfaces and a positive optical power, and a third lens having a negative optical power and an aspheric concave surface facing the second lens. The focal length $f_1$ of the first lens and the focal length $f_2$ of the second lens are selected for satisfying a condition of $0.55 < f_1/f_2 < 1.2$.

16 Claims, 10 Drawing Figures

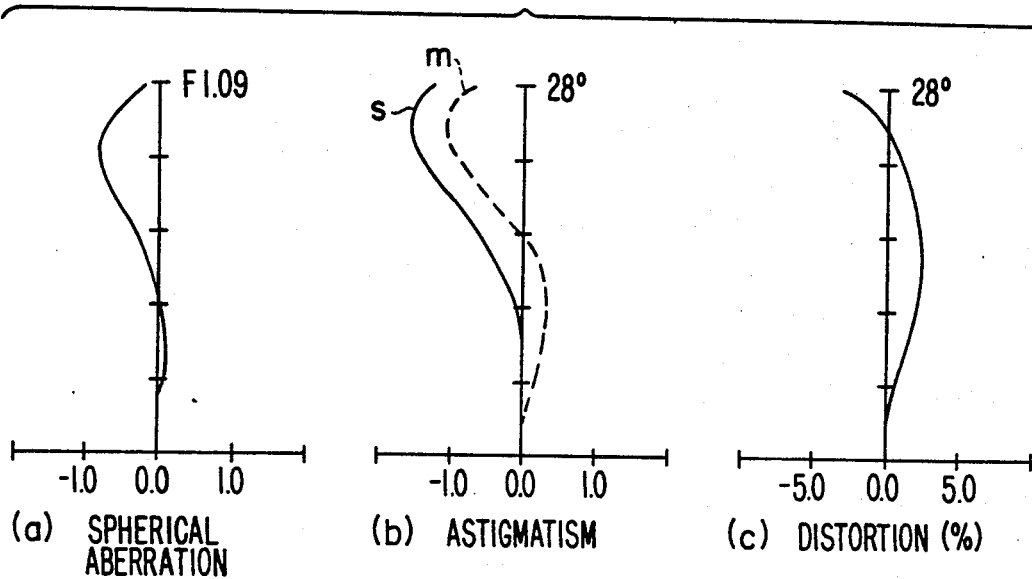
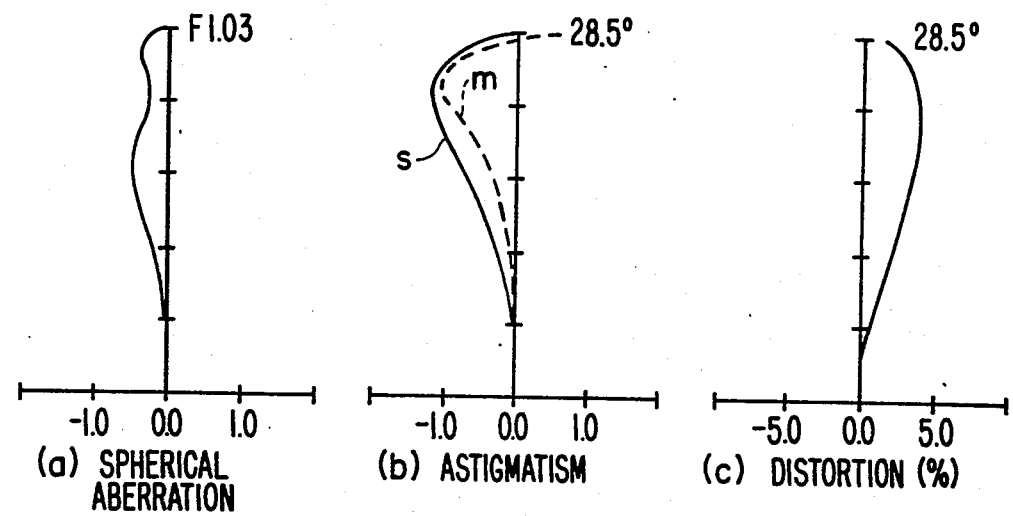

COMPACT PROJECTION LENS

BACKGROUND OF THE INVENTION

1. Field of the Invention

The present invention relates to a projection lens applicable to a video projector which projects an enlargement of an image appearing on a cathode-ray tube (CRT) onto a screen, and more particularly to a compact projection lens with a large aperture obtained through employment of lens with aspheric surfaces and proper selection of optical power.

2. Description of the Prior Art

In a three-tube type video projector which projects onto a screen enlargements of images appearing on blue, red and green CRTs each having a relatively narrow width of emission spectrum through the projection lenses, it is not required to correct the chromatic aberration of each lens. Meanwhile, due to outstanding developments involving a plastic molding technique, lenses having aspheric surfaces can recently be formed with high accuracy and at a low cost. Combining the features of the video projector system described above and the development of the manufacturing technique for lenses having aspheric surfaces, simplified projection lenses having a structure consisting of three lenses including an aspheric surface lens have been proposed as disclosed in the Japanese Laid-Open Patent Application No. 55-124114 (Japanese Patent Application corresponding to U.S. Pat. No. 4,300,817), Japanese Laid-Open Patent Applications Nos. 57-34515, 57-108818 and 58-125007, and U.S. Pat. No. 4,348,081.

These conventional projection lenses are simple in structure, but lacking in compactness. Actually, in the conventional projection lenses, if the focal length of total lens system is represented by f, the length of the total lens system from the front surface of first lens to the rear surface of third lens is as long as 1.33f to 2.22f. Recently, a requirement for a small depth video projector set has been realized in the market place, and compactness of the lens system for the projector set is considered to be very important as a means for realizing such requirement.

SUMMARY OF THE INVENTION

It is an object of the present invention to solve disadvantages of the prior art described above and provide a compact and large-aperture projection lens.

A projection lens of the present invention comprises first, second and third lenses which are disposed successively in a direction from a screen to a cathode ray tube (CRT). The first lens has a positive optical power and at least one aspheric. A surface of the first lens that faces the screen is convex. The second lens is a bi-convex lens having a positive optical power. The third lens has a negative optical power and an aspheric concave surface that faces the second lens. Focal lengths $f_1$ and $f_2$ respectively of the first and second lenses are selected to satisfy the following relation:

$$0.55 < f_1/f_2 < 1.2$$

It is preferable for effective correction of aberration that both surfaces of the first lens are aspheric surfaces and that the first lens is meniscus shaped and has a positive optical power.

The above and other objects, features and advantages of the invention will become apparent from the following description taken in connection with the accompanying drawings.

BRIEF DESCRIPTION OF THE DRAWINGS

FIG. 3 through FIG. 10 respectively are aberration diagrams of embodiments 1 to 8.

DESCRIPTION OF THE PREFERRED EMBODIMENTS

Figure 1:
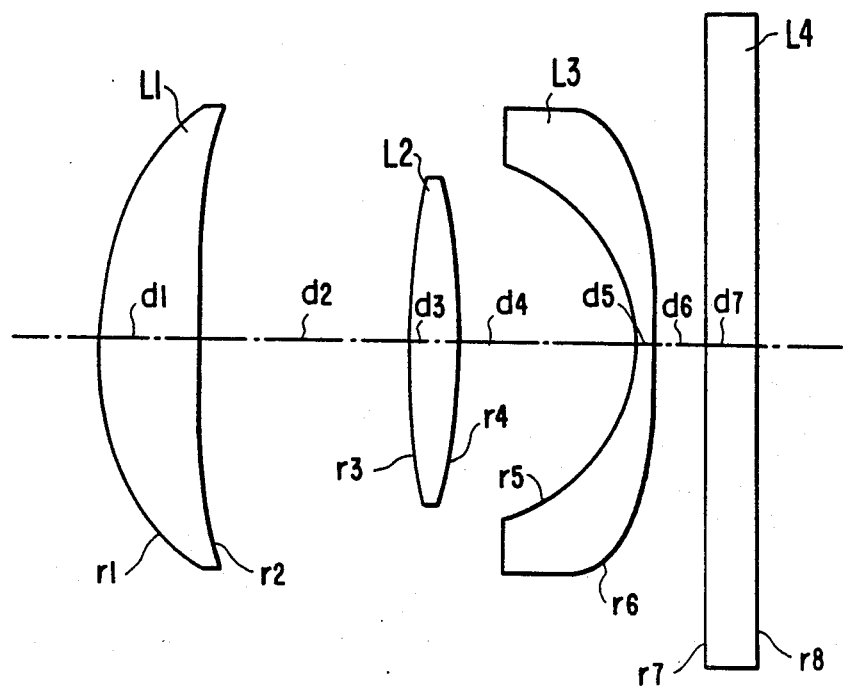
FIG. 1 is a sectional view showing the structure of projection lenses of embodiments 1 to 5 of the present invention.

FIG. 1 is a sectional view showing the structure of a projection lens of the present invention. In FIG. 1, a first lens $L_1$ is an element having two surfaces, at least one of the surfaces is an aspheric surface of positive optical power and the surface of the lens $L_1$ that faces screen (not shown) is convex. A second lens $L_2$ is an element having bi-convex surfaces of positive optical power. A third lens $L_3$ is an element having an aspheric surface of negative optical power that is a concave surface facing the second lens. An element $L_4$ is a face plate of a CRT having two planar surfaces and does not give any influence on optical power.

The optical power of the total lens system is almost determined by the optical powers of the first and second lenses $L_1$ and $L_2$. The third lens $L_3$ is arranged near the face plate $L_4$ of the CRT to act as a field flattener.

Figure 2:
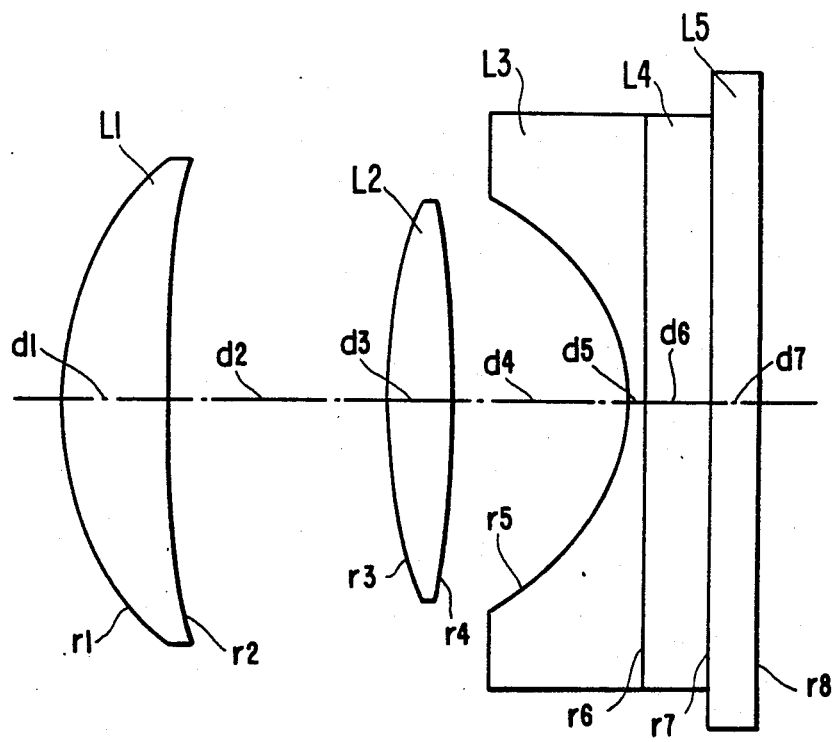
FIG. 2 is a sectional view showing the structure of projection lenses of embodiments 6 to 8 of the present invention.
Figure 5:
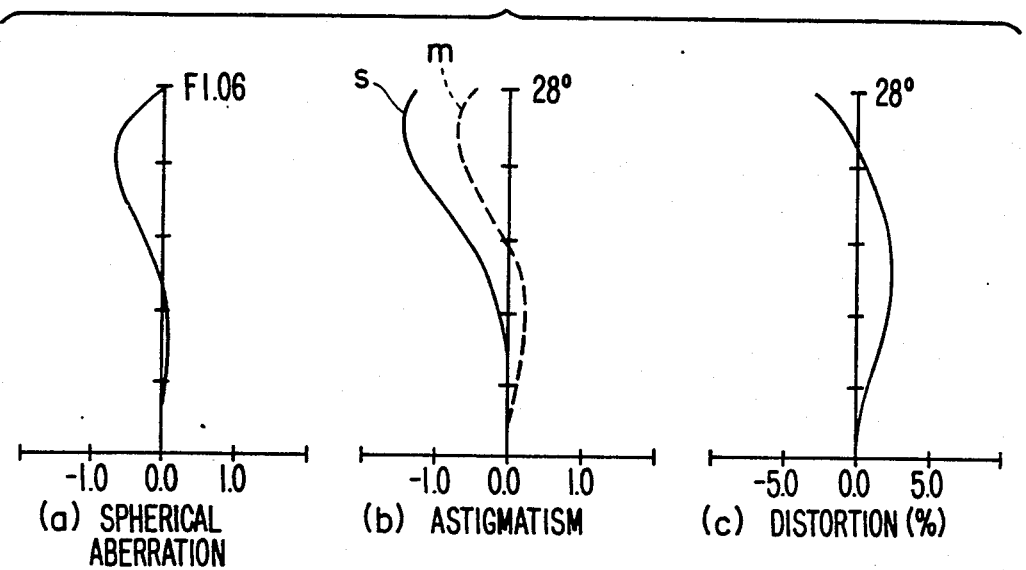
Figure 6:
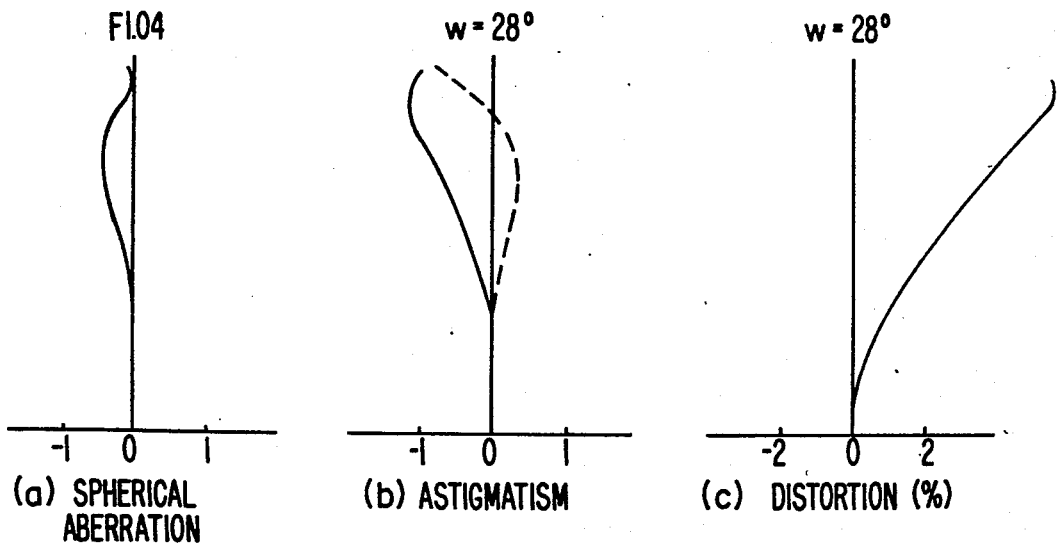
Figure 7:
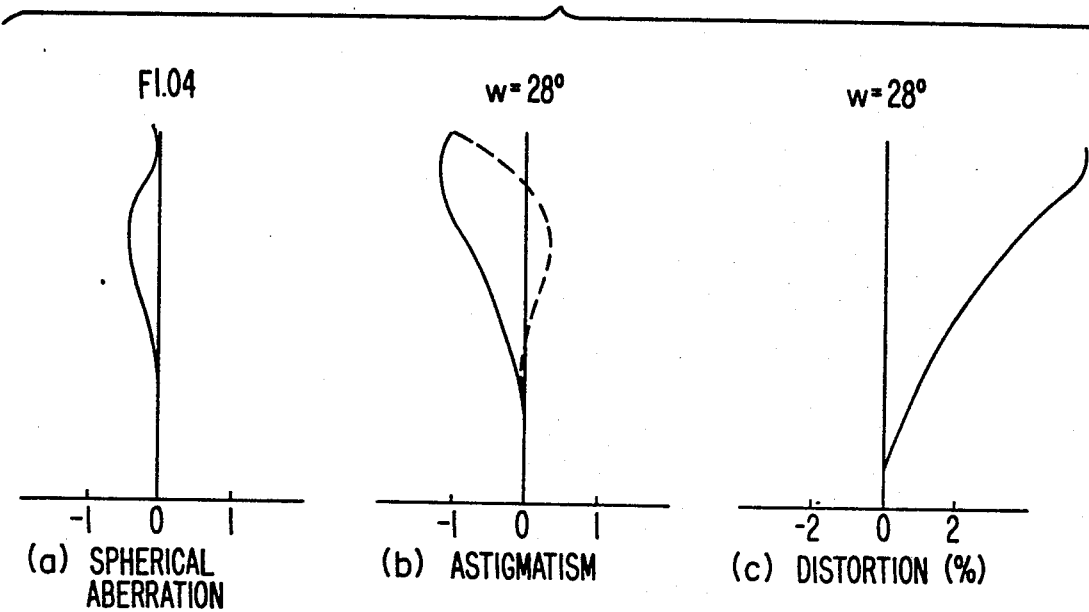

FIG. 2 is a sectional view showing another structure of the projection lens of the present invention, which is different from that of FIG. 1 in that a space between the third lens $L_3$ and a face plate $L_5$ of the CRT having two planar surfaces is filled with an optical transparent medium $L_4$. The optical transparent medium $L_4$ may be ethylene glycol or silicone gel or other materials having a refractive index that is almost the same as that of the face plate $L_5$ and the third lens $L_3$.

In the projection system having the projection lens shown in FIG. 2, reflections at the face plate $L_5$ and at the surface the third lens $L_3$ facing the CRT can be prevented, so that a high contrast image can be obtained.

The projection lens of the present invention is as bright as about 1.3 or less in terms of F number and has a semi-field angle ranging from 20° to 30°. It is required for effective correction of aberration that the first and third lenses each have at least one aspheric surface. Moreover, selection of optical parameters is important for realizing compactness in structure. In the structure of FIG. 1, the projection lens of the present invention satisfies the following condition, in which the focal length of the first lens is $f_1$ and that of the second lens is $f_2$:

$$0.55 < f_1/f_2 < 1.2 \qquad (1)$$

The condition (1) relates to distribution of optical powers of the first and second lenses $L_1$ and $L_2$. If $f_1/f_2$ exceeds the upper limit of the condition (1), an adverse effect on compactness of the lens system results. If $f_1/f_2$ is below the lower limit of the condition (1), the lens system is superior in compactness, but the optical power of the first lens is too strong, and correction of coma becomes difficult. Simultaneously, the first lens $L_1$ must be thick, and thus is difficult manufacture.

The first lens $L_1$ may be preferably bi-aspheric and meniscus shaped for effective correction of on-axis and off-axis aberration. If the first lens $L_1$ is plano-convex or bi-convex, correction of off-axis aberration becomes difficult even if it is bi-aspheric.

Moreover, it is preferable to satisfy the following conditions for realizing a compact projection lens having excellent optical performance, in which that the focal length of the total lens system is f, the focal length of the third lens $L_3$ is $f_3$, and the axial spacing between the second lens $L_2$ and the third lens $L_3$ is $d_4$:

$$0.6 < f/f_1 < 0.9 \quad (2)$$

$$0.45 < f/f_2 < 0.85 \quad (3)$$

$$-1.4 < f/f_3 < -0.95 \quad (4)$$

$$0.25 < d_4/f < 0.45 \quad (5)$$

The condition (2) relates to the distribution of optical power of the first lens $L_1$. If $f/f_1$ exceeds the upper limit of condition (2), the lens system is superior in compactness but makes difficult correction of coma. If $f/f_1$ is below the lower limit, the lens system is inferior in compactness. The condition (3) relates to distribution of optical power of the second lens $L_2$. If $f/f_2$ is below the lower limit, the lens system is superior in compactness but makes difficult correction of coma. If $f/f_2$ exceeds the upper limit, the lens system is inferior in compactness. The condition (4) relates to distribution of optical power of the third lens $L_3$. If $f/f_3$ exceeds the upper limit, correction of Petzval curvature becomes insufficient. If $f/f_3$ is below the lower limit of condition (4), correction of Petzval curvature becomes excessive and the curvature of the surface of the third lens $L_3$ that faces the screen must be very sharp and is thus difficult to manufacture. If $d_4/f$ exceeds the upper limit of condition (5), the back focal length is very short, and the space between the third lens $L_3$ and the face plate of CRT is too narrow to facilitate a satisfactory heat radiation effect of the CRT. If $d_4/f$ is below the lower limit of condition (5), correction of off-axis aberration becomes difficult.

In the structure shown in FIG. 2, the surface of the third lens $L_3$ facing the CRT has a very weak optical power and contributes less to the correction of aberration. Therefore, the focal length $f_1$ of the first lens $L_1$ and the focal length $f_2$ of the second lens $L_2$ are preferably selected to satisfy the following relation:

$$0.8 < f_1/f_2 < 1.1 \quad (6)$$

Even in the structure of FIG. 2, the shape of the first lens $L_1$ is preferably meniscus shaped and bi-aspherical for effective correction of on-axis and off-axis aberration.

Moreover, it is preferable, in the structure of FIG. 2, to satisfy the following conditions for realizing a projection lens having good optical performance, in which the focal length of the total lens system including the first lens $L_1$, second lens $L_2$, third lens $L_3$, optical transparent medium $L_4$ and face plate $L_5$ of CRT is f, and the total focal length of the system including the third lens $L_3$, optical transparent medium $L_4$ and face plate $L_5$ of CRT is $f_3$:

$$0.6 < f/f_1 < 0.9 \quad (7)$$

$$0.6 < f/f_2 < 0.8 \quad (8)$$

$$-1.45 < f/f_3 < -1.0 \quad (9)$$

Eight preferred embodiments of the present invention will be indicated below.

Figure 8:
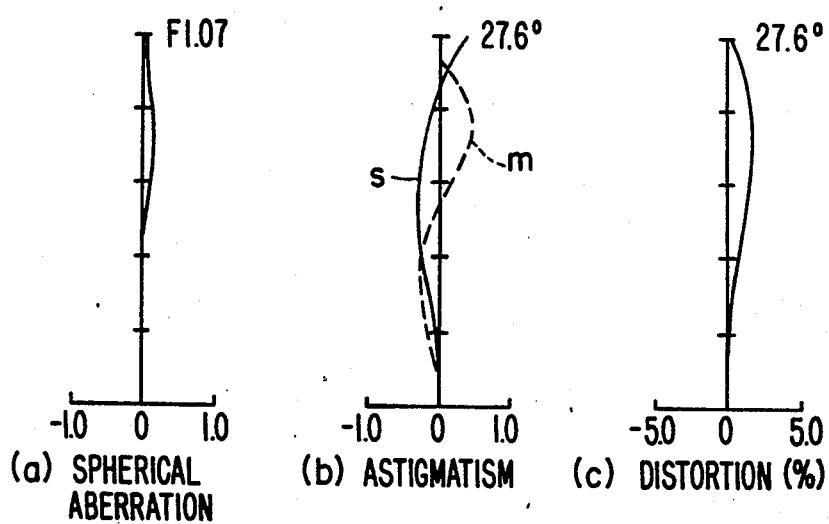
Figure 9:
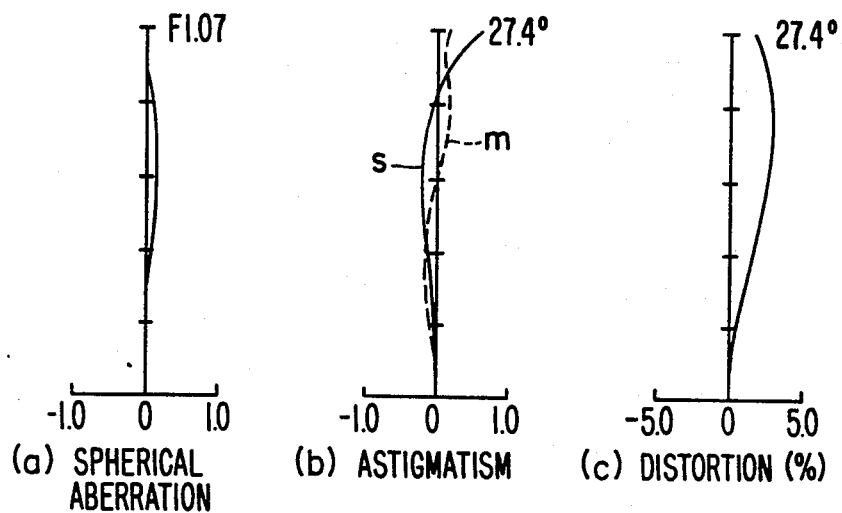
Figure 10:
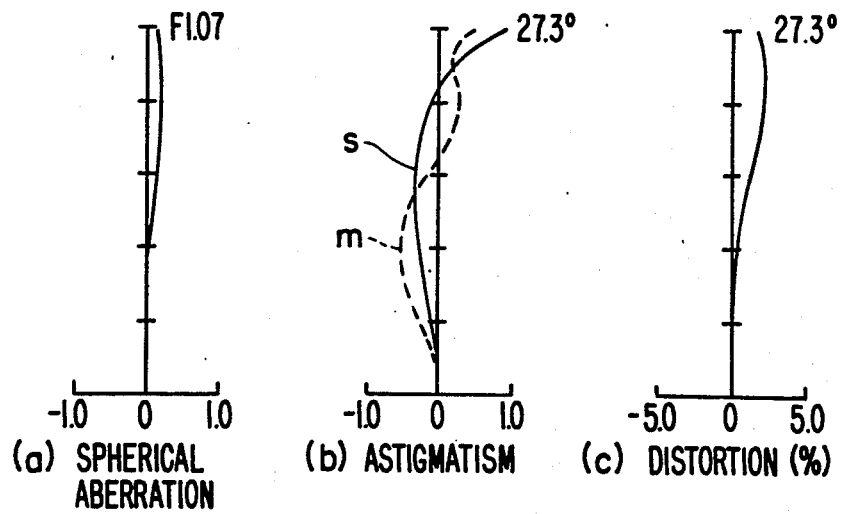

Embodiments 1 to 5 have the structure shown in FIG. 1, and Embodiments 6 to 8 have the structure shown in FIG. 8. In the tables of these embodiments: f is focal length of the total lens system; FNO is F number; $\beta$ is a magnification factor of the projected enlarged image; $\omega$ is a semi-field angle; $r_1, r_2, \ldots$ are radii of curvature of lens surfaces disposed successively from the screen side; $d_1, d_2, \ldots$ are axial distances between the surfaces; $n_1, n_2, \ldots$ are refractive indices with respect to e-lines of the lenses. In addition, each lens surface indicated by asterisk (*) means an aspheric surface. The shape of each aspheric surface is expressed by the following equation, in which the optical axis direction is the X axis, the Y axis is set perpendicular to X axis, curvature at the apex of the aspheric surface is C ($=1/r$), the conic constant is K, and the coefficients of the aspheric surfaces are AD, AE, AF and AG:

$$X = \{CY^2/(1 + \sqrt{1 - (1 + K)C^2Y^2}\} + AD \cdot Y^4 + AE \cdot Y^6 + AF \cdot Y^8 + AG \cdot Y^{10} \quad (10)$$

| Embodiment 1: |
|---| f = 105.5912 mm, FNO = 1.09, $\beta$ = 8, $\omega$ = 28°

| | |
|---|---|
| $L_1$ | $r_1^* = 67.595$, $d_1 = 23.00$, $n_1 = 1.49383$ |
| | $r_2^* = 755.259$, $d_2 = 50.03$ |
| $L_2$ | $r_3 = 194.743$, $d_3 = 11.00$, $n_2 = 1.59143$ |
| | $r_4 = -153.513$, $d_4 = 39.88$ |
| $L_3$ | $r_5^* = -58.399$, $d_5 = 4.00$, $n_3 = 1.49383$ |
| | $r_6^* = 211.964$, $d_6 = 11.67$ |
| $L_4$ | $r_7 = \infty$, $d_7 = 11.30$, $n_4 = 1.50701$ |
| | $r_8 = \infty$ |

| Aspheric surface coefficients | | | |
|---|---|---|---|
| 1st surface ($r_1$) | 2nd surface ($r_2$) | 5th surface ($r_5$) | 6th surface ($r_6$) |
| K = $-8.22051 \times 10^{-3}$ | K = 0 | K = $-1.42426 \times 10^{-1}$ | K = 0 |
| AD = $-2.97488 \times 10^{-7}$ | AD = $1.67317 \times 10^{-7}$ | AD = $-1.04799 \times 10^{-5}$ | AD = $-7.66911 \times 10^{-6}$ |
| AE = $3.19720 \times 10^{-11}$ | AE = $4.09030 \times 10^{-11}$ | AE = $4.09255 \times 10^{-9}$ | AE = $3.85597 \times 10^{-9}$ |

-continued

Embodiment 1:

| | | | |
|---|---|---|---|
| AF = $-1.96955 \times 10^{-14}$ | AF = $9.18299 \times 10^{-15}$ | AF = $2.76216 \times 10^{-12}$ | AF = $-7.76261 \times 10^{-13}$ |
| AG = $3.76861 \times 10^{-18}$ | AG = $2.48620 \times 10^{-18}$ | AG = $-2.00208 \times 10^{-15}$ | AG = $-3.21834 \times 10^{-18}$ |

Embodiment 2:

$f = 102.3821$ mm, FNO = 1.03, $\beta = 8$, $\omega = 28.5°$ $L_1$ $\begin{cases} r_1^* = 57.765, d_1 = 27.50, n_1 = 1.49383 \\ r_2^* = 477.615, d_2 = 42.90 \end{cases}$ $L_2$ $\begin{cases} r_3 = 184.134, d_3 = 10.00, n_2 = 1.59143 \\ r_4 = -177.317, d_4 = 33.98 \end{cases}$ $L_3$ $\begin{cases} r_5^* = -40.331, d_5 = 4.00, n_3 = 1.49383 \\ r_6^* = 1499.777, d_6 = 11.45 \end{cases}$ $L_4$ $\begin{cases} r_7 = \infty, d_7 = 11.30, n_4 = 1.50701 \\ r_8 = \infty \end{cases}$

Aspheric surface coefficients

| 1st surface ($r_1$) | 2nd surface ($r_2$) | 5th surface ($r_5$) | 6th surface ($r_6$) |
|---|---|---|---|
| K = $-2.64181 \times 10^{-2}$ | K = 0 | K = $-1.03266 \times 10^{-1}$ | K = 0 |
| AD = $-2.56344 \times 10^{-7}$ | AD = $3.84028 \times 10^{-7}$ | AD = $-6.24963 \times 10^{-6}$ | AD = $-5.93580 \times 10^{-6}$ |
| AE = $1.91073 \times 10^{-11}$ | AE = $3.86106 \times 10^{-11}$ | AE = $1.50264 \times 10^{-9}$ | AE = $3.49243 \times 10^{-9}$ |
| AF = $-6.35407 \times 10^{-14}$ | AF = $1.36346 \times 10^{-14}$ | AF = $3.92315 \times 10^{-12}$ | AF = $-9.49020 \times 10^{-13}$ |
| AG = $2.16835 \times 10^{-17}$ | AG = $1.89686 \times 10^{-17}$ | AG = $-2.19525 \times 10^{-15}$ | AG = $6.63995 \times 10^{-17}$ |

Embodiment 3:

$f = 111.9919$ mm, FNO = 1.06, $\beta = 8$, $\omega = 26°$ $L_1$ — $r_1^* = 59.514, d_1 = 33.60, n_1 = 1.49383$
$r_2^* = 760.731, d_2 = 48.12$ $L_2$ — $r_3 = 141.464, d_3 = 9.28, n_2 = 1.59143$
$r_4 = -1870.233, d_4 = 31.82$ $L_3$ — $r_5^* = -42.675, d_5 = 4.00, n_3 = 1.49383$
$r_6^* = -441.527, d_6 = 12.12$ $L_4$ — $r_7 = \infty, d_7 = 11.30, n_4 = 1.50701$
$r_8 = \infty$

Aspheric surface coefficients

| 1st surface ($r_1$) | 2nd surface ($r_2$) | 5th surface ($r_5$) | 6th surface ($r_6$) |
|---|---|---|---|
| K = $-2.00194 \times 10^{-1}$ | K = 0 | K = $2.06888 \times 10^{-1}$ | K = 0 |
| AD = $-1.78061 \times 10^{-7}$ | AD = $1.52329 \times 10^{-7}$ | AD = $-4.09241 \times 10^{-6}$ | AD = $-4.82831 \times 10^{-6}$ |
| AE = $1.59536 \times 10^{-11}$ | AE = $5.78020 \times 10^{-11}$ | AE = $-8.62785 \times 10^{-10}$ | AE = $7.43592 \times 10^{-10}$ |
| AF = $2.76185 \times 10^{-15}$ | AF = $2.43279 \times 10^{-14}$ | AF = $1.71913 \times 10^{-15}$ | AF = $-7.10194 \times 10^{-14}$ |
| AG = $-3.61813 \times 10^{-18}$ | AG = $4.32731 \times 10^{-18}$ | AG = $6.53607 \times 10^{-16}$ | AG = $-3.32847 \times 10^{-17}$ |

Embodiment 4:

$f = 103.832$ mm, FNO = 1.04, $\beta = 7.9$, $\omega = 28°$ $L_1$ — $r_1^* = 60.499, d_1 = 22.50, n_1 = 1.49294$
$r_2^* = 284.847, d_2 = 44.18$ $L_2$ — $r_3 = 179.596, d_3 = 11.10, n_2 = 1.66152$
$r_4 = -175.911, d_4 = 39.97$ $L_3$ — $r_5^* = -36.097, d_5 = 3.50, n_3 = 1.49294$
$r_6^* = -203.611, d_6 = 12.50$ $L_4$ — $r_7 = \infty, d_7 = 11.30, n_4 = 1.50701$
$r_8 = \infty$

Aspheric surface coefficients

| 1st surface ($r_1$) | 2nd surface ($r_2$) | 5th surface ($r_5$) | 6th surface ($r_6$) |
|---|---|---|---|
| K = $-2.25816 \times 10^{-1}$ | K = 0.0 | K = $-3.95441 \times 10^{-1}$ | K = 1.0617 |
| AD = $-1.05728 \times 10^{-7}$ | AD = $3.75191 \times 10^{-7}$ | AD = $-2.81000 \times 10^{-6}$ | AD = $-1.71377 \times 10^{-6}$ |
| AE = $6.91262 \times 10^{-11}$ | AE = $1.26302 \times 10^{-10}$ | AE = $4.27576 \times 10^{-9}$ | AE = $1.56053 \times 10^{-9}$ |
| AF = $-1.48111 \times 10^{-14}$ | AF = $-1.32567 \times 10^{-14}$ | AF = $-2.14192 \times 10^{-12}$ | AF = $-5.26639 \times 10^{-13}$ |
| AG = $1.69956 \times 10^{-18}$ | AG = $3.16037 \times 10^{-18}$ | AG = $4.95337 \times 10^{-16}$ | AG = $5.87926 \times 10^{-17}$ |

| Embodiment 5: |
|---|
| $f = 103.305$ mm, $FNO = 1.04$, $\beta = 7.9$, $\omega = 28°$ |

| | |
|---|---|
| $L_1$ | $r_1^* = 60.631$, $d_1 = 22.50$, $n_1 = 1.49294$ |
| | $r_2^* = 262.070$, $d_2 = 43.71$ |
| $L_2$ | $r_3 = 182.454$, $d_3 = 11.30$, $n_2 = 1.66152$ |
| | $r_4 = -158.300$, $d_4 = 40.32$ |
| $L_3$ | $r_5^* = -35.731$, $d_5 = 3.50$, $n_3 = 1.49294$ |
| | $r_6^* = -231.986$, $d_6 = 12.50$ |
| $L_4$ | $r_7 = \infty$, $d_7 = 11.30$, $n_4 = 1.50701$ |
| | $r_8 = \infty$ |

Aspheric surface coefficients

| 1st surface ($r_1$) | 2nd surface ($r_2$) | 5th surface ($r_5$) | 6th surface ($r_6$) |
|---|---|---|---|
| $K = -2.26401 \times 10^{-1}$ | $K = 0.0$ | $K = -3.96257 \times 10^{-1}$ | $K = -8.61001$ |
| $AD = -8.90561 \times 10^{-8}$ | $AD = 4.33459 \times 10^{-7}$ | $AD = -2.10108 \times 10^{-6}$ | $AD = -1.71377 \times 10^{-6}$ |
| $AE = 8.30701 \times 10^{-11}$ | $AE = 1.55682 \times 10^{-10}$ | $AE = 3.82498 \times 10^{-9}$ | $AE = 1.56053 \times 10^{-9}$ |
| $AF = -1.38306 \times 10^{-14}$ | $AF = -1.15839 \times 10^{-14}$ | $AF = -1.90113 \times 10^{-12}$ | $AF = -5.26639 \times 10^{-13}$ |
| $AG = 2.63500 \times 10^{-18}$ | $AG = 4.64431 \times 10^{-18}$ | $AG = 4.60694 \times 10^{-16}$ | $AG = 5.87925 \times 10^{-17}$ |

| Embodiment 6: |
|---|
| $f = 107.0920$ mm, $FNO = 1.07$, $\beta = 8$, $\omega = 27.6°$ |

| | |
|---|---|
| $L_1$ | $r_1^* = 68.108$, $d_1 = 24.75$, $n_1 = 1.49383$ |
| | $r_2^* = 534.862$, $d_2 = 50.32$ |
| $L_2$ | $r_3 = 129.497$, $d_3 = 13.86$, $n_2 = 1.66152$ |
| | $r_4 = -341.603$, $d_4 = 39.92$ |
| $L_3$ | $r_5^* = -40.519$, $d_5 = 4.00$, $n_3 = 1.49383$ |
| | $r_6 = \infty$, $d_6 = 15.00$, $n_4 = 1.40000$ |
| $L_4$ | $r_7 = \infty$, $d_7 = 11.30$, $n_5 = 1.50701$ |
| $L_5$ | $r_8 = \infty$ |

Aspheric surface coefficients

| 1st surface ($r_1$) | 2nd surface ($r_2$) | 5th surface ($r_5$) |
|---|---|---|
| $K = -1.85703 \times 10^{-1}$ | $K = 0$ | $K = -2.77480 \times 10^{-1}$ |
| $AD = -1.58529 \times 10^{-7}$ | $AD = 1.13389 \times 10^{-7}$ | $AD = 2.29358 \times 10^{-7}$ |
| $AE = 1.02218 \times 10^{-11}$ | $AE = 9.51142 \times 10^{-11}$ | $AE = 5.66260 \times 10^{-10}$ |
| $AF = 7.83141 \times 10^{-15}$ | $AF = -1.67223 \times 10^{-14}$ | $AF = -6.11644 \times 10^{-13}$ |
| $AG = -2.42171 \times 10^{-18}$ | $AG = 1.32250 \times 10^{-18}$ | $AG = 3.78696 \times 10^{-16}$ |

| Embodiment 7: |
|---|
| $f = 107.272$ mm, $FNO = 1.07$, $\beta = 8$, $\omega = 27.4°$ |

| | |
|---|---|
| $L_1$ | $r_1^* = 67.279$, $d_1 = 24.75$, $n_1 = 1.49383$ |
| | $r_2^* = 933.523$, $d_2 = 53.34$ |
| $L_2$ | $r_3 = 121.118$, $d_3 = 13.86$, $n_2 = 1.66152$ |
| | $r_4 = -549.439$, $d_4 = 35.18$ |
| $L_3$ | $r_5^* = -41.337$, $d_5 = 4.00$, $n_3 = 1.49383$ |
| | $r_6 = \infty$, $d_6 = 15.00$, $n_4 = 1.40000$ |
| $L_4$ | $r_7 = \infty$, $d_7 = 11.30$, $n_5 = 1.50701$ |
| $L_5$ | $r_8 = \infty$ |

Aspheric surface coefficients

| 1st surface ($r_1$) | 2nd surface ($r_2$) | 5th surface ($r_5$) |
|---|---|---|
| $K = -1.77684 \times 10^{-1}$ | $K = 0$ | $K = -2.98233 \times 10^{-1}$ |
| $AD = -1.46766 \times 10^{-7}$ | $AD = 1.26654 \times 10^{-7}$ | $AD = -1.11187 \times 10^{-6}$ |
| $AE = 5.59345 \times 10^{-12}$ | $AE = 6.97637 \times 10^{-11}$ | $AE = 1.74088 \times 10^{-9}$ |
| $AF = 4.48889 \times 10^{-15}$ | $AF = -1.88187 \times 10^{-14}$ | $AF = -1.11040 \times 10^{-12}$ |
| $AG = -2.63074 \times 10^{-18}$ | $AG = 1.72086 \times 10^{-18}$ | $AG = 4.17534 \times 10^{-16}$ |

| Embodiment 8: |
|---|
| $f = 106.122$ mm, $FNO = 1.07$, $\beta = 8$, $\omega = 27.3°$ |

| | |
|---|---|
| $L_1$ | $r_1^* = 63.453$, $d_1 = 25.00$, $n_1 = 1.49383$ |
| | $r_2^* = 1047.699$, $d_2 = 51.86$ |
| $L_2$ | $r_3 = 115.872$, $d_3 = 12.50$, $n_2 = 1.66152$ |
| | $r_4 = -880.068$, $d_4 = 31.83$ |
| $L_3$ | $r_5^* = -36.231$, $d_5 = 4.00$, $n_3 = 1.49383$ |
| | $r_6 = -234.825$, $d_6 = 15.00$, $n_4 = 1.40000$ |
| $L_4$ | $r_7 = \infty$, $d_7 = 11.30$, $n_5 = 1.50701$ |
| $L_5$ | $r_8 = \infty$ |

Aspheric surface coefficients

-continued

Embodiment 8:

| 1st surface ($r_1$) | 2nd surface ($r_2$) | 5th surface ($r_5$) |
|---|---|---|
| $K = -2.21027 \times 10^{-1}$ | $K = 0$ | $K = -4.01076 \times 10^{-1}$ |
| $AD = -1.45550 \times 10^{-7}$ | $AD = 1.32072 \times 10^{-7}$ | $AD = 6.96109 \times 10^{-7}$ |
| $AE = 2.97430 \times 10^{-12}$ | $AE = 7.18818 \times 10^{-11}$ | $AE = 5.33866 \times 10^{-10}$ |
| $AF = 5.53656 \times 10^{-15}$ | $AF = -1.91998 \times 10^{-14}$ | $AF = -9.77248 \times 10^{-13}$ |
| $AG = -2.68180 \times 10^{-18}$ | $AG = 1.84976 \times 10^{-18}$ | $AG = 6.02807 \times 10^{-16}$ |

Conditions of the focal lengths $f_1$, $f_2$, $f_3$, axial spacing $d_4$ and total length L are shown in Table 1. Here, total length L is expressed by the following relation in the structures shown in FIG. 1 and FIG. 2.

$$L = d_1 + d_2 + d_3 + d_4 + d_5 \quad (11)$$

TABLE 1

| Embodiment | $f_1/f_2$ | $f/f_1$ | $f/f_2$ | $f/f_3$ | $d_4/f$ | $L/f$ |
|---|---|---|---|---|---|---|
| 1 | 1.012 | 0.710 | 0.719 | −1.144 | 0.378 | 1.211 |
| 2 | 0.844 | 0.786 | 0.663 | −1.288 | 0.332 | 1.156 |
| 3 | 0.578 | 0.870 | 0.503 | −1.167 | 0.284 | 1.132 |
| 4 | 1.109 | 0.688 | 0.762 | −1.159 | 0.385 | 1.168 |
| 5 | 1.190 | 0.669 | 0.796 | −1.199 | 0.390 | 1.174 |
| 6 | 1.081 | 0.689 | 0.746 | −1.305 | 0.373 | 1.241 |
| 7 | 0.962 | 0.738 | 0.709 | −1.282 | 0.328 | 1.222 |
| 8 | 0.872 | 0.782 | 0.682 | −1.402 | 0.300 | 1.180 |

As is apparent from Table 1, the total length L of the projection lens of the present invention is as short as 1.25f or less, and thus compactness is attained as compared with the length 1.33f to 2.22f of the prior art.

FIG. 3 to FIG. 10 respectively show aberration performances of embodiments 1 to 8. In each of FIGS. 3 to 10, (a), (b) and (c) respectively show spherical aberration, astigmatism and distortion. As seen from FIGS. 3 to 10, these aberrations are excellently corrected in all of embodiments 1 to 8.

What is claimed is:

1. A projection lens disposed between a cathode ray tube (CRT) and a screen for projecting an enlargement of an image on the cathode ray tube (CRT) onto the screen, said projection lens comprising:
   first, second and third lenses disposed successively in a direction extending from the screen to the CRT,
   said first lens having a positive optical power and two optical surfaces spaced from one another in said direction and through which said image passes to the screen, at least one of said two surfaces being aspherical, and the one of said two surfaces that faces the screen being convex,
   said second lens having a positive optical power, and bi-convex surfaces spaced from one another in said direction and through which said image passes before passing through said first lens,
   said third lens having a negative optical power and an aspheric concave surface facing said second lens through which said image passes before passing through said second lens, and
   the projection lens satisfying the following condition $$0.55 < f_1/f_2 < 1.2$$

in which $f_1$ is the focal length of said first lens and $f_2$ is the focal length of said second lens.

2. The projection lens according to claim 1, wherein said first lens has a meniscus shape with both of said two surfaces thereof being aspheric, and the convex surface having a smaller radius of curvature than the other of said two surfaces.

3. The projection lens according to claim 1, and further comprising a fourth lens disposed between said third lens and the cathode ray tube; and which is defined as follows

| $f = 105.5912$ mm, FNO $= 1.09$, $\beta = 8$, $\omega = 28°$ | |
|---|---|
| $L_1$ | $r_1^* = 67.595$, $d_1 = 23.00$, $n_1 = 1.49383$ |
| | $r_2^* = 755.259$, $d_2 = 50.03$ |
| $L_2$ | $r_3 = 194.743$, $d_3 = 11.00$, $n_2 = 1.59143$ |
| | $r_4 = -153.513$, $d_4 = 39.88$ |
| $L_3$ | $r_5^* = -58.399$, $d_5 = 4.00$, $n_3 = 1.49383$ |
| | $r_6^* = 211.964$, $d_6 = 11.67$ |
| $L_4$ | $r_7 = \infty$, $d_7 = 11.30$, $n_4 = 1.50701$ |
| | $r_8 = \infty$ |

| Aspheric surface coefficients | | | |
|---|---|---|---|
| 1st surface ($r_1$) | 2nd surface ($r_2$) | 3rd surface ($r_5$) | 4th surface ($r_6$) |
| $K = -8.22051 \times 10^{-3}$ | $K = 0$ | $K = -1.42426 \times 10^{-1}$ | $K = 0$ |
| $AD = -2.97488 \times 10^{-7}$ | $AD = 1.67317 \times 10^{-7}$ | $AD = -1.04799 \times 10^{-5}$ | $AD = -7.66911 \times 10^{-6}$ |
| $AE = 3.19720 \times 10^{-11}$ | $AE = 4.09030 \times 10^{-11}$ | $AE = 4.09255 \times 10^{-9}$ | $AE = 3.85597 \times 10^{-9}$ |
| $AF = -1.96955 \times 10^{-14}$ | $AF = 9.18299 \times 10^{-15}$ | $AF = 2.76216 \times 10^{-12}$ | $AF = -7.76261 \times 10^{-13}$ |
| $AG = 3.76861 \times 10^{-18}$ | $AG = 2.48620 \times 10^{-18}$ | $AG = -2.00208 \times 10^{-15}$ | $AG = -3.21834 \times 10^{-18}$ | in which $L_1$–$L_4$ are said first, second, third and fourth lenses which respectively define lens elements of the projection lens; f is a total focal length of said projection lens; FNO is F number; B is a magnification factor of the projected enlarged image; $\omega$ is a semi-field angle; $r_1$–$r_8$ are radii of curvature of successive surfaces of said lens elements in said direction from the screen; $d_1$–$d_7$ are axial distances in said direction between the surfaces; $n_1$–$n_4$ are refractive indices with respect to e-lines of said lens elements; K is a conic constant, AD, AE, AF and AG are coefficients of each aspheric surface; and * indicates respective aspheric surfaces of said lens elements.

4. The projections lens according to claim 1, and further comprising a fourth lens disposed between said third lens and the cathode ray tube; and which is defined as follows

| $f = 102.3821$ mm, FNO $= 1.03$, $\beta = 8$, $\omega = 28.5°$ | |
|---|---|
| $L_1$ | $r_1^* = 57.765$, $d_1 = 27.50$, $n_1 = 1.49383$ |
|  | $r_2^* = 477.615$, $d_2 = 42.90$ |
| $L_2$ | $r_3 = 184.134$, $d_3 = 10.00$, $n_2 = 1.59143$ |
|  | $r_4 = -177.317$, $d_4 = 33.98$ |
| $L_3$ | $r_5^* = -40.331$, $d_5 = 4.00$, $n_3 = 1.49383$ |
|  | $r_6^* = 1499.777$, $d_6 = 11.45$ |
| $L_4$ | $r_7 = \infty$, $d_7 = 11.30$, $n_4 = 1.50701$ |
|  | $r_8 = \infty$ |

| Aspheric surface coefficients | | | |
|---|---|---|---|
| 1st surface ($r_1$) | 2nd surface ($r_2$) | 5th surface ($r_5$) | 6th surface ($r_6$) |
| $K = -2.64181 \times 10^{-2}$ | $K = 0$ | $K = -1.03266 \times 10^{-1}$ | $K = 0$ |
| $AD = -2.56344 \times 10^{-7}$ | $AD = 3.84028 \times 10^{-7}$ | $AD = -6.24963 \times 10^{-6}$ | $AD = -5.93580 \times 10^{-6}$ |
| $AE = 1.91073 \times 10^{-11}$ | $AE = 3.86106 \times 10^{-11}$ | $AE = 1.50264 \times 10^{-9}$ | $AE = 3.49243 \times 10^{-9}$ |
| $AF = -6.35407 \times 10^{-14}$ | $AF = 1.36346 \times 10^{-14}$ | $AF = 3.92315 \times 10^{-12}$ | $AF = -9.49020 \times 10^{-13}$ |
| $AG = 2.16835 \times 10^{-17}$ | $AG = 1.89686 \times 10^{-17}$ | $AG = 2.19525 \times 10^{-15}$ | $AG = 6.63995 \times 10^{-17}$ | in which $L_1$–$L_4$ are said first, second, third and fourth lenses which respectively define lens elements of the projection lens; f is a total focal length of said projection lens; FNO is F number; B is a magnification factor of the projected enlarged image; $\omega$ is a semi-field angle; $r_1$–$r_8$ are radii of curvature of successive surfaces of said lens elements in said direction from the screen; $d_1$–$d_7$ are axial distances in said direction between the surfaces; $n_1$–$n_4$ are refractive indices with respect to e-lines of said lens elements; K is a conic constant; AD, AE, AF and AG are coefficients of each aspheric surface, and * indicates respective aspheric surfaces of said lens elements.

5. The projections lens according to claim 1, and further comprising a fourth lens disposed between said third lens and the cathode ray tube; and which is defined as follows in which $L_1$–$L_4$ are said first, second, third and fourth lenses which respectively define lens elements of the projection lens; f is a total focal length of said projection lens; FNO is F number; B is a magnification factor of the projected enlarged image; $\omega$ is a semi-field angle; $r_1$–$r_8$ are radii of curvature of successive surfaces of said lens elements in said direction from the screen; $d_1$–$d_7$ are axial distances in said direction between the surfaces; $n_1$–$n_4$ are refractive indices with respect to e-lines of said lens elements; K is a conic constant; AD, AE, AF and AG are coefficients of each aspheric surface; and * indicates respective aspheric surfaces of said lens elements.

6. The projection lens according to claim 1, and further comprising a fourth lens disposed between said third lens and the cathode ray tube; and which is defined as follows

| $f = 111.9919$ mm, FNO $= 1.06$, $\beta = 8$, $\omega = 26°$ | |
|---|---|
| $L_1$ | $r_1^* = 59.514$, $d_1 = 33.60$, $n_1 = 1.49383$ |
|  | $r_2^* = 760.731$, $d_2 = 48.12$ |
| $L_2$ | $r_3 = 141.464$, $d_3 = 9.28$, $n_2 = 1.59143$ |
|  | $r_4 = -1870.233$, $d_4 = 31.82$ |
| $L_3$ | $r_5^* = -42.675$, $d_5 = 4.00$, $n_3 = 1.49383$ |
|  | $r_6^* = -441.527$, $d_6 = 12.12$ |
| $L_4$ | $r_7 = \infty$, $d_7 = 11.30$, $n_4 = 1.50701$ |
|  | $r_8 = \infty$ |

| Aspheric surface coefficients | | | |
|---|---|---|---|
| 1st surface ($r_1$) | 2nd surface ($r_2$) | 5th surface ($r_5$) | 6th surface ($r_6$) |
| $K = -2.00194 \times 10^{-1}$ | $K = 0$ | $K = 2.06888 \times 10^{-1}$ | $K = 0$ |
| $AD = -1.78061 \times 10^{-7}$ | $AD = 1.52329 \times 10^{-7}$ | $AD = -4.09241 \times 10^{-6}$ | $AD = -4.82831 \times 10^{-6}$ |
| $AE = -1.59536 \times 10^{-11}$ | $AE = 5.78020 \times 10^{-11}$ | $AE = -8.62785 \times 10^{-10}$ | $AE = 7.43592 \times 10^{-10}$ |
| $AF = 2.76185 \times 10^{-15}$ | $AF = -2.43279 \times 10^{-14}$ | $AF = 1.71913 \times 10^{-15}$ | $AF = -7.10194 \times 10^{-14}$ |
| $AG = -3.61813 \times 10^{-18}$ | $AG = 4.32731 \times 10^{-18}$ | $AG = 6.53607 \times 10^{-16}$ | $AG = -3.32847 \times 10^{-17}$ |

| $f = 103.832$ mm, FNO $= 1.04$, $\beta = 7.9$, $\omega = 28°$ | |
|---|---|
| $L_1$ | $r_1^* = 60.499$, $d_1 = 22.50$, $n_1 = 1.49294$ |
|  | $r_2^* = 284.847$, $d_2 = 44.18$ |
| $L_2$ | $r_3 = 179.596$, $d_3 = 11.10$, $n_2 = 1.66152$ |
|  | $r_4 = -175.911$, $d_4 = 39.97$ |
| $L_3$ | $r_5^* = -36.097$, $d_5 = 3.50$, $n_3 = 1.49294$ |
|  | $r_6^* = -203.611$, $d_6 = 12.50$ |
| $L_4$ | $r_7 = \infty$, $d_7 = 11.30$, $n_4 = 1.50701$ |
|  | $r_8 = \infty$ |

| Aspheric surface coefficients | | | |
|---|---|---|---|
| 1st surface ($r_1$) | 2nd surface ($r_2$) | 5th surface ($r_5$) | 6th surface ($r_6$) |
| $K = -2.25816 \times 10^{-1}$ | $K = 0.0$ | $K = 3.95441 \times 10^{-1}$ | $K = 1.0617$ |
| $AD = -1.05728 \times 10^{-7}$ | $AD = 3.75191 \times 10^{-7}$ | $AD = -2.81000 \times 10^{-6}$ | $AD = -1.71377 \times 10^{-6}$ |
| $AE = 6.91262 \times 10^{-11}$ | $AE = 1.26302 \times 10^{-10}$ | $AE = 4.27576 \times 10^{-9}$ | $AE = 1.56053 \times 10^{-9}$ |
| $AF = -1.48111 \times 10^{-14}$ | $AF = -1.32567 \times 10^{-14}$ | $AF = -2.14192 \times 10^{-12}$ | $AF = -5.26639 \times 10^{-13}$ |

| -continued | | | |
|---|---|---|---|
| $AG = 1.69956 \times 10^{-18}$ | $AG = 3.16037 \times 10^{-18}$ | $AG = 4.95337 \times 10^{-16}$ | $AG = 5.87926 \times 10^{-17}$ | in which $L_1$–$L_4$ are said first, second, third and fourth lenses which respectively define lens elements of the projection lens; f is a total focal length of said projection lens; FNO is F number; B is a magnification factor of the projected enlarged image; $\omega$ is a semi-field angle; $r_1$–$r_8$ are radii of curvature of successive surfaces of said lens elements in said direction from the screen; $d_1$–$d_7$ are axial distances in said direction between the surfaces; $n_1$–$n_4$ are refractive indices with respect to e-lines of said lens elements; K is a conic constant; AD, AE, AF and AG are coefficients of each aspheric surface; and * indicates respective aspheric surfaces of said lens elements.

7. The projection lens according to claim 1, and further comprising a fourth lens disposed between said third lens and the cathode ray tube; and which is defined as follows $$0.25 < d_4/f < 0.45$$

in which $d_4$ is an axial spacing in said direction between the second lens and the third lens.

10. A projection lens disposed between a face plate of a cathode ray tube (CRT) and a screen for projecting an enlargement of an image on the cathode ray tube (CRT) onto the screen, said projection lens comprising:

first, second and third lenses disposed successively in a direction extending from the screen to the CRT; and a transparent optical medium extending between said third lens and the face plate of the CRT, said transparent optical medium, said third lens and the face plate all having respective refractive indices that are substantially equal to one another,

| | $f = 103.305$ mm, FNO $= 1.04$, $\beta = 7.9$, $\omega = 28°$ |
|---|---|
| $L_1$ | $r_1^* = 60.631$, $d_1 = 22.50$, $n_1 = 1.49294$ |
| | $r_2^* = 262.070$, $d_2 = 43.71$ |
| $L_2$ | $r_3 = 182.454$, $d_3\ 11.30$, $n_2\ 1.66152$ |
| | $r_4 = -158.300$, $d_4\ 40.32$ |
| $L_3$ | $r_5^* = -35.731$, $d_5 = 3.50$, $n_3 = 1.49294$ |
| | $r_6^* = -231.986$, $d_6 = 12.50$ |
| $L_4$ | $r_7 = \infty$, $d_7 = 11.30$, $n_4 = 1.50701$ |
| | $r_8\ \infty$ |

| Aspheric surface coefficients | | | |
|---|---|---|---|
| 1st surface ($r_1$) | 2nd surface ($r_2$) | 5th surface ($r_5$) | 6th surface ($r_6$) |
| $K = -2.26401 \times 10^{-1}$ | $K = 0.0$ | $K = -3.96257 \times 10^{-1}$ | $K = -8.61001$ |
| $AD = -8.90561 \times 10^{-8}$ | $AD = 4.33459 \times 10^{-7}$ | $AD = -2.10108 \times 10^{-6}$ | $AD = -1.71377 \times 10^{-6}$ |
| $AE = 8.30701 \times 10^{-11}$ | $AE = 1.55682 \times 10^{-10}$ | $AE = 3.82498 \times 10^{-9}$ | $AE = 1.56053 \times 10^{-9}$ |
| $AF = -1.38306 \times 10^{-14}$ | $AF = -1.15839 \times 10^{-14}$ | $AF = -1.90113 \times 10^{-12}$ | $AF = -5.26639 \times 10^{-13}$ |
| $AG = 2.63500 \times 10^{-18}$ | $AG = 4.64431 \times 10^{-18}$ | $AG = 4.60694 \times 10^{-16}$ | $AG = 5.87925 \times 10^{-17}$ | in which $L_1$–$L_4$ are said first, second, third and fourth lenses which respectively define lens elements of the projection lens; f is a total focal length of said projection lens; FNO is F number; B is a magnification factor of the projected enlarged image; $\omega$ is a semi-field angle; $r_1$–$r_8$ are radii of curvature of successive surfaces of said lens elements in said direction from the screen; $d_1$–$d_7$ are axial distances in said direction between the surfaces; $n_1$–$n_4$ are refractive indices with respect to e-lines of said lens elements; K is a conic constant; AD, AE, AF and AG are coefficients of each aspheric surface; and * indicates respective aspheric surfaces of said lens elements.

8. The projection lens according to claim 1, and further satisfying the following conditions $$0.6 < f/f_1 < 0.9$$

$$0.45 < f/f_2 < 0.85$$

$$-1.40 < f/f_3 < -0.95$$

in which f is a total focal length of said projection lens, and $f_3$ is a focal length of the third lens.

9. The projection lens according to claim 8, and further satisfying the following condition said first lens having a positive optical power and two optical surfaces spaced from one another in said direction and through which said image passes to the screen, at least one of said two surfaces being aspherical, and the one of said two surfaces that faces the screen being convex, said second lens having a positive optical power, and bi-convex surfaces spaced from one another in said direction and through which said image passes before passing through said first lens, said third lens having a negative optical power and an aspheric concave surface facing said second lens through which said image passes before passing through said second lens, and the projection lens satisfying the following condition $$0.8 < f_1/f_2 < 1.1$$

in which $f_1$ is the focal length of said first lens and $f_2$ is the focal length of said second lens.

11. The projection lens according to claim 10, wherein said third lens has a flat surface facing the CRT.

12. The projection lens according to claim 10, and further defined substantially as follows

| | $f = 107.0920$ mm, FNO $= 1.07$, $\beta = 8$, $\omega = 27.6°$ |
|---|---|
| $L_1$ | $r_1^* = 68.108$, $d_1 = 24.75$, $n_1 = 1.49383$ |

-continued

|  | |
|---|---|
| L$_2$ | r$_2$* = 534.862, d$_2$ = 50.32<br>r$_3$ = 129.497, d$_3$ = 13.86, n$_2$ = 1.66152<br>r$_4$ = −341.603, d$_4$ = 39.92 |
| L$_3$ | r$_5$* = −40.519, d$_5$ = 4.00, n$_3$ = 1.49383<br>r$_6$ = ∞, d$_6$ = 15.00, n$_4$ = 1.40000 |
| L$_4$ | r$_7$ = ∞, d$_7$ = 11.30, n$_5$ 1.50701 |
| L$_5$ | r$_8$ = ∞ |

| | Aspheric surface coefficients | |
|---|---|---|
| 1st surface (r$_1$) | 2nd surface (r$_2$) | 5th surface (r$_5$) |
| K = −1.85703 × 10$^{-1}$ | K = 0 | K = −2.77480 × 10$^{-1}$ |
| AD = −1.58529 × 10$^{-7}$ | AD = 1.13389 × 10$^{-7}$ | AD = 2.29358 × 10$^{-7}$ |
| AE = 1.02218 × 10$^{-11}$ | AE = 9.51142 × 10$^{-11}$ | AE = 5.66260 × 10$^{-10}$ |
| AF = 7.83141 × 10$^{-15}$ | AF = −1.67223 × 10$^{-14}$ | AF = −6.11644 × 10$^{-13}$ |
| AG = −2.42171 × 10$^{-18}$ | AG = 1.32250 × 10$^{-18}$ | AG = 3.78696 × 10$^{-16}$ | in which L$_1$–L$_5$ are said first lens, said second lens, said third lens, said transparent optical medium and the face plate which respectively define elements of the projection lens; f is a total focal length of the projection lens; FNO is F number; b is a magnification factor of the projected enlarged image; ω is a semi-field angle; r$_1$–r$_8$ are radii of curvature of successive surfaces of said elements in said direction from the screen; d$_1$–d$_7$ are axial distances in said direction between the surfaces; n$_1$–d$_5$ are refractive indices with respect to e-lines of said elements, K is a conic constant; AD, AE, AF and AG are coefficients of each aspheric surface; and * indicates respective aspheric surfaces of said elements.

13. The projection lens according to claim 10, and further defined substantially as follows

| f = 107.272 mm, FNO = 1.07, β = 8, ω = 27.4° | |
|---|---|
| L$_1$ | r$_1$* = 67.279, d$_1$ = 24.75, n$_1$ = 1.49383<br>r$_2$* = 933.523, d$_2$ = 53.34 |
| L$_2$ | r$_3$ = 121.118, d$_3$ = 13.86, n$_2$ = 1.66152<br>r$_4$ = −549.439, d$_4$ = 35.18 |
| L$_3$ | r$_5$* = −41.337, d$_{2.63074}$ = 4.00, n$_3$ = 1.49383<br>r$_6$ = ∞, d$_6$ = 15.00, n$_4$ = 1.40000 |
| L$_4$ | r$_7$ = ∞, d$_7$ = 11.30, n 5 = 1.50701 |
| L$_5$ | r$_8$ = ∞ |

| | Aspheric surface coefficients | |
|---|---|---|
| 1st surface (r$_1$) | 2nd surface (r$_2$) | 5th surface (r$_5$) |
| K = −1.77684 × 10$^{-1}$ | K = 0 | K = −2.98233 × 10$^{-1}$ |
| AD = −1.46766 × 10$^{-7}$ | AD = 1.26654 × 10$^{-7}$ | AD = −1.11187 × 10$^{-6}$ |
| AE = 5.59345 × 10$^{-12}$ | AE = 6.97637 × 10$^{-11}$ | AE = 1.74088 × 10$^{-9}$ |
| AF = 4.48889 × 10$^{-15}$ | AF = −1.88187 × 10$^{-14}$ | AF = −1.11040 × 10$^{-12}$ |
| AG = −1.263074 × 10$^{-18}$ | AG = 1.72086 × 10$^{-18}$ | AG = 4.17534 × 10$^{-16}$ | in which L$_1$–L$_5$ are said first lens, said second lens, said third lens, said transparent optical medium and the face plate which respectively define elements of the projection lens; f is a total focal length of the projection lens; FNO is F number; b is a magnification factor of the projected enlarged image; ω is a semi-field angle; r$_1$–r$_8$ are radii of curvature of successive surfaces of said elements in said direction from the screen; d$_1$–d$_7$ are axial distances in said direction between the surfaces; n$_1$–d$_5$ are refractive indices with respect to e-lines of said elements, K is a conic constant; AD, AE, AF and AG are coefficients of each aspheric surface; and * indicates respective aspheric surfaces of said elements.

14. The projection lens according to claim 10, and further defined substantially as follows

| f = 106.122 mm, FNO = 1.07, β = 8, ω = 27.3° | |
|---|---|
| L$_1$ | r$_1$* = 63.453, d$_1$ = 25.00, n$_1$ = 1.49383<br>r$_2$* = 1047.699, d$_2$ = 51.86 |
| L$_2$ | r$_3$ = 115.872, d$_3$ = 12.50, n$_2$ = 1.66152<br>r$_4$ = −880.068, d$_4$ = 21.83 |
| L$_3$ | r$_5$* = −36.231, d$_5$ = 4.00, n$_3$ = 1.49383<br>r$_6$ = −234.825, d$_6$ = 15.00, n$_4$ = 1.40000 |
| L$_4$ | r$_7$ = ∞, d$_7$ = 11.30, n$_5$ = 1.50701 |
| L$_5$ | r$_8$ = ∞ |

| | Aspheric surface coefficients | |
|---|---|---|
| 1st surface (r$_1$) | 2nd surface (r$_2$) | 5th surface (r$_5$) |
| K = −2.21027 × 10$^{-1}$ | K = 0 | K = −4.01076 × 10$^{-1}$ |
| AD = −1.45550 × 10$^{-7}$ | AD = 1.32072 × 10$^{-7}$ | AD = 6.96109 × 10$^{-7}$ |
| AE = 2.97430 × 10$^{-12}$ | AE = 7.18818 × 10$^{-11}$ | AE = 5.33866 × 10$^{-10}$ |
| AF = 5.53656 × 10$^{-15}$ | AF = −1.91998 × 10$^{-14}$ | AF = −9.77248 × 10$^{-13}$ |
| AG = −2.68180 × 10$^{-18}$ | AG = 1.84976 × 10$^{-18}$ | AG = 6.02807 × 10$^{-16}$ | in which L$_1$–L$_5$ are said first lens, said second lens, said third lens, said transparent optical medium and the face plate which respectively define elements of the projection lens; f is a total focal length of the projection lens; FNO is F number; b is a magnification factor of the projected enlarged image; ω is a semi-field angle, r$_1$–r$_8$ are radii of curvature of successive surfaces of said elements in said direction from the screen; $d_1$–$d_7$ are axial distances in said direction between the surfaces; $n_1$–$d_5$ are refractive indices with respect to e-lines of said elements, K is a conic constant; AD, AE, AF and AG are coefficients of each aspheric surface; and * indicates respective aspheric surfaces of said elements.

15. The projection lens according to claim 10, wherein said first lens has a meniscus shape with both of said two surfaces thereof being aspheric, and the convex surface having a smaller radius of curvature than the other of said two surfaces.

16. The projection lens according to claim 15, wherein said third lens has a flat surface facing the CRT.

* * * * *